(12) United States Patent
Tahernezhaadi et al.

(10) Patent No.: US 6,347,140 B1
(45) Date of Patent: Feb. 12, 2002

(54) ECHO CANCELING METHOD AND APPARATUS

(75) Inventors: Mansour Tahernezhaadi, Naperville; Michael J. Kirk, Mount Prospect, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/373,040

(22) Filed: Aug. 12, 1999

(51) Int. Cl.[7] .......................... H04L 5/14; H04L 12/56; H04B 3/23; H04B 3/20; H04M 9/00

(52) U.S. Cl. .................... 379/406.01; 379/406.02; 379/406.05; 379/406.06; 379/406.08; 379/406.1; 379/406.11

(58) Field of Search ................... 370/286, 287, 370/290, 291; 379/400–411, 373, 215, 212, 376

(56) References Cited

U.S. PATENT DOCUMENTS

| | | | | |
|---|---|---|---|---|
| 5,535,194 A | * | 7/1996 | Ashley et al. | 370/32.1 |
| 5,539,812 A | * | 7/1996 | Kitchin et al. | 379/189 |
| 5,606,550 A | * | 2/1997 | Jangi | 370/289 |
| 5,633,868 A | * | 5/1997 | Baldwin et al. | 370/331 |
| 5,764,759 A | * | 6/1998 | Hamilton et al. | 379/410 |
| 6,029,065 A | * | 2/2000 | Shah | 455/414 |
| H1921 H | * | 11/2000 | Fletcher et al. | 455/433 |

* cited by examiner

*Primary Examiner*—Forester W. Isen
*Assistant Examiner*—Ramnandan Singh
(74) *Attorney, Agent, or Firm*—Sayed Hossain Beladi; Lalita P. Williams

(57) ABSTRACT

In a communication system (100), a first echo return loss through communication system (100) associated with a first call connection between a caller (111) and a first caller (114) is estimated. A second echo return loss associated with a second call connection between caller (111) and a second caller (112) is estimated. The call connection may be switching from the first call connection to the second call connection after estimating the first echo return loss, and from the second call connection to the first call connection after estimating the second echo return loss. Echo generated in the first call connection is cancelled based on at least the first echo return loss by an echo canceller in communication system (100) after switching from the second call connection to the first call connection.

8 Claims, 2 Drawing Sheets

ECHO CANCELING METHOD AND APPARATUS

RELATED FIELD OF THE INVENTION

The invention generally relates to echo cancellation in a communication system.

BACKGROUND OF THE INVENTION

Echo cancellation in long distance telephonic communications is well known in the art. The need for such echo cancellation arises from impedance mismatches and/or acoustic echo associated with wireline telephone subscribers and an economic decision by telephone carriers to use two-wire connections between wireline subscribers and the central telephone offices.

Two-wire connections require mixing of a duplex telephone signal (transmit and receive) for exchange between the central telephone office and the wireline subscriber. The mixing of transmit and receive signals results in a portion of a received signal being re-transmitted as an outgoing signal from a receiving subscriber to a transmitting subscriber. While the retransmitted signal may be perceived as a "hollow" sound to local communicators, the retransmitted signal may represent a distracting echo in long distance communications.

The delay experienced by a subscriber between a transmission and an echo may be a determining factor in the acceptability and usability of the communication channel. Short delays experienced between local communicators (on the order of 1–20 milliseconds) typically do not represent an impediment to the efficient exchange of spoken words. Longer delays, (on the order of 250–500 milliseconds), however, may result in syllables and even entire words being repeated as an echo and may render the communication channel unusable.

The advent of digital mobile communications systems has exacerbated the problem of time delays, and hence, the need for echo cancellation. Vocoder delays, convolutional coding algorithms, etc. typically introduce round trip signal delays in mobile communication circuits on the order of 200 milliseconds.

The solution to the echo problem has been to provide computer based echo cancellers. Echo cancellers are typically based on adaptive finite impulse filter (AFIR) theory. A comprehensive discussion of AFIR theory is provided in *Adaptive Filter Theory*, 2nd ed., by Simon Haykin, Prentice Hall, 1991. AFIRs provide for echo cancellation by generating a mathematical model of the echo characteristics of a communication system as a step in canceling the echo.

AFIRs, however, suffered a number of disadvantages including poor filter convergence time and filter instability. The invention disclosed in commonly assigned U.S. Pat. No. 5,295,136 entitled "METHOD OF PERFORMING CONVERGENCE IN A, LEAST MEAN SQUARE, ADAPTIVE FILTER, ECHO CANCELLER" the disclosure of which is hereby expressly incorporated herein by reference, solved these problems by providing an improved method for converging an adaptive filter echo canceller. The method disclosed provided for identifying the location of a primary echo in the echo filter vector, dividing the vector into primary and secondary vectors and increasing the adaptation rate relative to filter locations proximate to the primary echo. The primary echo has been determined to contain substantially all of the echo energy, and increasing the adaptation rate proximate to the primary echo provides fast filter convergence without instability.

Double-talk correction in echo cancellers, as presently known, is a process designed to inhibit update of the adaptive filter coefficients in an echo canceller, such as disclosed in commonly assigned U.S. Pat. No. 5,295,136, the disclosure of which is hereby expressly incorporated herein by reference, when the "near-end" speaker is talking. If adaptation of the filter vector coefficients is not inhibited upon detection of near-end speech, the filter vector will diverge leading to poor communication quality. Double-talk detectors designed to inhibit adaptation of the echo canceller filter during periods of near-end speech are traditionally based on comparing an estimated power of the received echo signal to some fixed threshold of the maximum estimated transmit power. This can be represented as:

$$r_s(0) > d_{th} \times r_x(0)_{max},$$

where $r_s(0)$ is the estimated power of the echo signal, $r_x(0)_{max}$ is the maximum estimated transmit power and $d_{th}$ is a double-talk threshold constant. Once double-talk is detected, adaptation of the echo canceller is inhibited for a "hangover" period. A disadvantage of a fixed threshold double-talk detector is that the threshold must satisfy the worst case echo return loss (ERL), which is usually about 6 dB. However, typical ERL can be much higher and has readily been observed at 22 dB or more. Therefore, significant filter divergence can occur during double-talk, prior to detection, particularly when the near-end speech is at relatively low energy levels compared to that of the far-end.

Testing reveals that enough echo canceller filter divergence occurs prior to the detection of double-talk to cause significant distortion of the echo canceller output. Because of this filter divergence prior to double-talk detection and inhibited filter adaptation during double-talk, the echo canceller output can remain significantly distorted for at least the hangover period and potentially longer as the filter must readapt once double-talk is no longer detected and the hangover period has expired. The invention disclosed in commonly assigned U.S. Pat. No. 5,535,194, the disclosure of which is hereby expressly incorporated herein by reference, solves this problem by an echo canceller which-uses an adaptive double-talk detection threshold and an accurate estimation of reference energy to detect double-talk. The echo canceller further provides for correcting partial echo canceller adaptive filter vector divergence occurring prior to double-talk detection by maintaining and switching to an auxiliary echo canceller filter with known "good" filter coefficients.

Since the echo path is different for each call between two end points in a communication system, it is necessary to apply an echo canceling for each call such that the echo canceller adapts itself to the propagation delay, return loss and other factors associated with the call echo path. The U.S. Pat. No. 5,381,474 provides a method for fast convergence of the echo canceller at the start of the call.

In a communication system, a caller may be in communication with at least two other callers each with different echo path characteristics. In case of a "call waiting" situation, a caller while on call with a first caller takes a second call from a second caller. Call waiting has been made possible by switching from the first to the second caller. The caller may switch back from the second caller to the first caller. The caller may switch back and forth many times. In case of a call-waiting situation, a momentary echo occurs after the start of the first and second calls each time the caller switches between the first and second callers. Since each caller has different echo path characteristic, the caller experiences echo for at least some time after switching between the first and second callers.

Therefore, there is a need for a method for echo cancellation in a communication system where there is at least a caller having a call connection with a first and second callers.

DETAILED DESCRIPTION OF THE PREFERRED EMBODIMENT(S)

Figure 1:
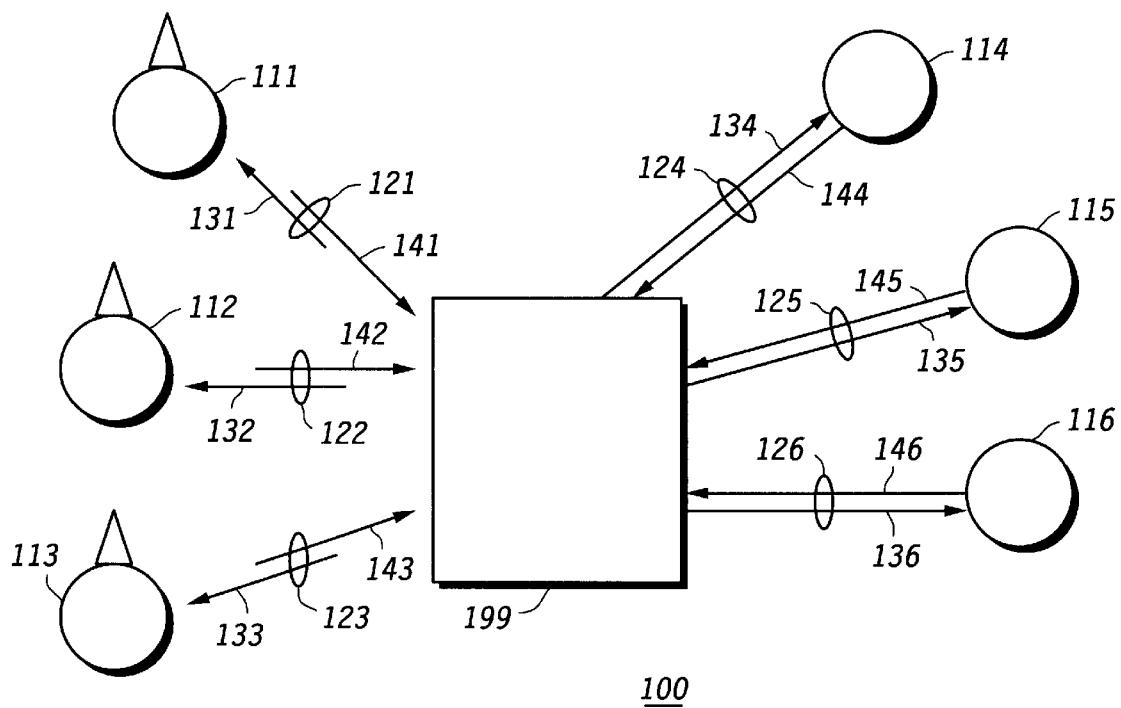
FIG. 1 depicts a conceptual block diagram of a communication system implementing various aspects of the invention.

According to various aspects of the invention, in a communication system, a first echo return loss through the communication system associated with a first call connection between a caller and a first caller is estimated. A second echo return loss associated with a second call connection between the caller and a second caller is estimated. The call connection may be switching from the first call connection to the second call connection after estimating the first echo return loss, and from the second call connection to the first call connection after estimating the second echo return loss. Echo generated in the first call connection is cancelled based on at least the first echo return loss by an echo canceller in the communication system after the switching from the second call connection to the first call connection. Furthermore, the switching from the first call connection to the second call connection may be repeating at least twice. The echo generated in the second call connection is cancelled based on at least the second echo return loss by the echo canceller in the communication system after at least twice switching from the first call connection to the second call connection. Furthermore, a first echo generation characteristics associated with a first echo path between the caller and the first caller is estimated. A first set of echo coefficients based on the first echo generation characteristics is estimated. Echo generated in the first call connection based on at least the first echo return loss and the first set of echo coefficients after switching from the second call connection is cancelled. Furthermore, a second echo generation characteristics associated with a second echo path between the caller and the second caller is estimated. A second set of echo coefficients based on the second echo generation characteristics is estimated. Echo generated in the second call connection by the echo canceller based on at least the second echo return loss and the second set of echo coefficients after at least twice switching from the first call connection to the second call connection is cancelled. There may be a need for detecting a call-waiting scenario call connection between the caller and the first and second callers. As such, a flash with information message may be received in facilitating detecting the call-waiting call connection based on a content of the flash with information message. Furthermore, there may be a need for detecting whether the call first and second call connections are of a zero echo path type call connections. If the first call connection is of the zero echo path type call connection, the echo canceller is bypassed for the first call connection, and if the second call connection is of the zero echo path type call connection, the echo canceller is bypassed for the second call connection.

According to further various aspects of the invention, in a communication systems, a first echo return loss through the communication system associated with a first call connection between a caller and a first caller is estimated. An echo canceller cancels echo generated in the first call connection based on at least the first echo return loss. The caller may switch from the first call connection to a second call connection between the caller and a second caller through the communication system. The caller and the first and second callers may be in a call waiting scenario call connection. The echo canceller cancels echo generated in the second call connection based on at least the second echo return loss. Furthermore, a first echo generation characteristics associated with a first echo path between the caller and the first caller is estimated. Based on the first echo generation characteristics, a first set of echo coefficients is generated. The echo canceller cancels echo generated in the first call connection further based on at least the first echo return loss and the first set of echo coefficients. The echo canceller cancels echo generated in the second call connection further based on at least the second echo return loss and the second set of echo coefficients.

According to further aspects of the invention, a second echo return loss associated with the second call connection is estimated. The caller may switch from the second call connection to the first call connection. The echo canceller cancels echo generated in the first call connection based on at least the first echo return loss after switching from the second call connection. Furthermore, a second echo generation characteristics associated with a second echo path between the caller and the second caller is estimated. A second set of echo coefficients based on the second echo generation characteristics is estimated. The echo canceller cancels echo generated in the first call connection further based on at least the first echo return loss and the first set of echo coefficients after switching from the second call connection.

The echo canceller undergoes reconvergence attempting to adapt to the echo path of a call connection. Depending on the convergence speed of the echo canceller, the echo canceller exhibits echo leak-through prior to full convergence after switching from a call connection to another. Echo leak-through transpire when the echo canceller has an inaccurate estimate of call connection echo return loss (ERL) parameter. The return loss parameter enables the echo canceller to differentiate between echo and the desired near-end speech signal. Echo canceller adaptive filter produces an inaccurate ERL estimate when insufficiently converged since echo canceller derives its ERL estimate from its adaptive filter. This in turn severely undermines echo canceller ability to distinguish between the desired near-end speech and echo signal resulting in echo leak-through.

The invention provides a low complexity algorithm for echo cancellation in a communication system. A call waiting normally is defined where a caller while having a first call connection with a first caller may establish a second call connection with a second caller without terminating the first call connection. An echo canceller may cancel echo generated associated with the first call connection, however, echo may leak through for as much as few seconds when switching from the first caller to the second caller, and from the second caller to the first caller. This is largely due to a delayed reaction at the echo canceller to reconverge since the changes in echo characteristics are different between a first and second echo paths associated respectively with the first and second call connections. The invention appropriately allows reconfiguring the critical parameters of an echo canceller used for canceling echo associated with the first and second echo paths. As such, the invention requires use of only one echo canceller for two or more call connections in a call waiting situation. According to the invention, reconvergence of the echo canceller is avoided when switching between parties in a call-waiting call scenario since the set of echo coefficients of one echo path is used again after switching back from the other call connection. Furthermore, echo canceller would take much less delay for convergence and adaptation to echo characteristics of one path when switching from the other path while using the echo return loss of one path estimated prior the switching.

Figure 2:
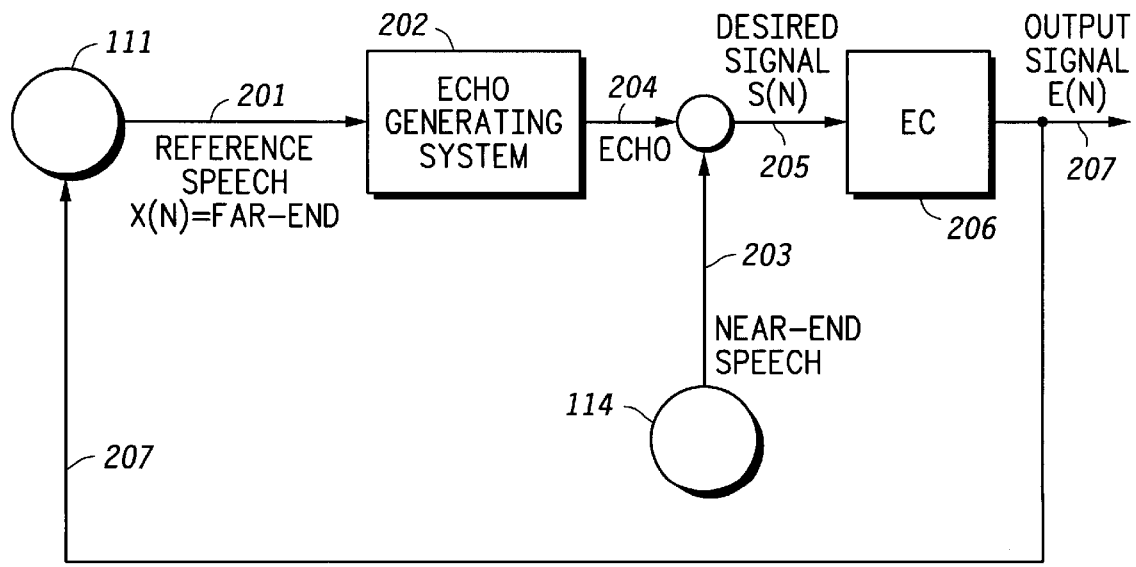
FIG. 2 depicts a call connection echo generation and cancellation between two callers.
Figure 3:
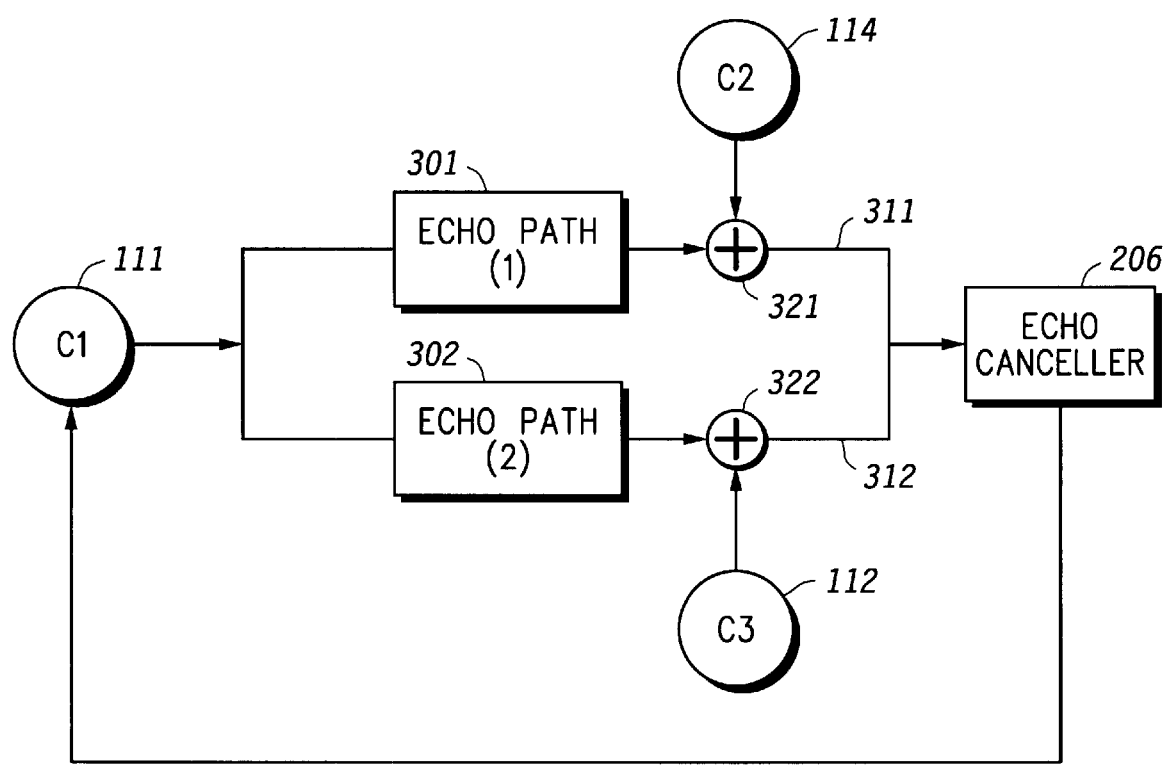
FIG. 3 depicts a call connection with echo generation and cancellation between callers of a two way-call-waiting call according to various aspects of the invention.

One or more aspects of the invention may be more apparent by making references to the following figures, FIGS. 1–3. FIG. 1 shows a conceptual block diagram of a communication system 100. The communication system 100 may have a number of end points that are depicted as callers 111–16. Such callers may be of different types such as wireline and wireless callers. Callers 111–13 are shown to be of one or more wireless caller types and callers 114–16 are shown to be of one or more wireline caller types. Caller types may include portable handheld units and computing units such as computers. Such types of callers include digital and analog callers. Digital callers normally are defined as callers that use voice compression and decompression. The callers may communicate with each other through a communication system infrastructure 199. The infrastructure 199 may include a number of different components such as a controller, a switch, a radio frequency section for communication with the wireless type callers, and a number of other components all known by one ordinary skilled in the art.

Callers 111–13 communicate with the infrastructure 199 via wireless links 121–23 respectively. Each link has two components: a forward link and a reverse link. The forward links are shown as forward links 131–133 and reverse links are shown as reverse links 141–43 respectively for links 121–23. Similarly, the wireline callers 114–16 have wireline links 124–26 with infrastructure 199. The links 124–26 have also similar forward links 134–36 and reverse links 144–46 respectively. A caller may communicate to any other caller having a connection with the infrastructure 199. For example caller 111 may make a call connection with caller 112, another wireless caller, or caller 114, a wireline caller. Caller 111 may also make a first call connection with caller 112, and a second call connection with caller 114 through a two way call waiting scenario. Three-or-more-way call waiting is also possible.

Referring to FIG. 2, a call connection with echo generation and cancellation between callers 111 and 114 is shown. A speech signal 201 carried by link 141 generated by caller 111 inputs to an echo generating system 202 generating echo signal 204. The echo generating system 202 is a conceptualized block modeling every element in the communication system 100 that generates echo in the echo path of the speech signal 201. The speech signal 201 is intended to be received by caller 114 having a call connection with caller 111 through communication system 100. The signal 201 may also be referred to as the reference signal or far-end talker x(n). The speech signal 203 of caller 114 intended for caller 111 may also be referred to as the near-end talker. The signal 203 is carried by link 144 generated by caller 114. The echo signal 204 and near end speech signal 203 are summed in the system to produce a signal 205 that includes near end speech signal 203 and echo signal 204. The objective is to remove echo from the summed signal 205 before the signal is received by caller 111. An echo canceller 206 removes the echo through known methods before passing a signal 207 to caller 111 on link 131.

Referring to FIG. 3, a call connection with echo generation and cancellation between callers 111, 112 and 114 according to various aspects of the invention in a call-waiting situation is shown. Call connection between three or more parties are also possible. According to the invention, a first echo return loss through the communication system 100 associated with a first call connection between caller 111 and caller 114 is estimated. An echo canceller 206 cancels echo generated in the first call connection based on at least the first echo return loss. Caller 111 may switch from the first call connection to a second call connection between caller 111 and a second caller 112 through the communication system 100. The echo canceller 206 cancels echo generated in the second call connection based on at least the first echo return loss. Furthermore, a first echo generation characteristics associated with a first echo path 301 between caller 111 and the first caller 114 is estimated. Based on the first echo generation characteristics, a first set of echo coefficients is generated. The echo canceller 206 cancels echo generated in the first call connection further based on at least the first echo return loss and the first set of echo coefficients. The echo canceller 206 cancels echo generated in the second call connection further based on at least the second echo return loss and the second set of echo coefficients.

According to further aspects of the invention, a second echo return loss associated with the second call connection is estimated. Caller 111 may switch from the second call connection to the first call connection. The echo canceller 206 cancels echo generated in the first call connection based on at least the first echo return loss after switching from the second call connection. Furthermore, a second echo generation characteristics associated with a second echo path 302 between caller 111 and second caller 112 is estimated. A second set of echo coefficients based on the second echo generation characteristics is estimated. The echo canceller 206 cancels echo generated in the first call connection further based on at least the second echo return loss and the second set of echo coefficients after switching from the second call connection.

Although there are one or more switching performed for making the call connections, the switches are not shown since selection of the location of the switches may be a designer choice. Preferably, the echo canceller 206 is placed as close to the source of the echo as possible in the communication system. Therefore, there may be a switch at the input of the echo canceller 206 switching its input between outputs 311 and 312 of summers 321 and 322 summing the respective echo and near end speech signals.

The wireless links 121–23 may be according to a predefined protocols such as the well known IS-95 and GSM protocols. A detection of a call-waiting call via decoding of a CDMA IS-95 reverse link layer 2 signaling message or similar message may be required. A mobile user, any of the callers 111–13, upon receiving the call waiting alert which may be in the form of an audible tone presses the send key in order to switch to the new caller. The send key is subsequently pressed when the mobile caller is switching between call waiting parties. Upon pressing the send key, the mobile sends a layer 2 reverse link signaling on traffic channel called "Flash With Information Message" (FWIM) to the infrastructure unit 199. An algorithm for echo cancellation in a communication system according to various aspect of the invention may include receiving call waiting message via a flash with information (FWIM) message.

At the infrastructure unit 199, the reverse link layer 2 signaling on traffic channel is decoded. Indicative of a call waiting call, it may be necessary to specifically look for a message of 6 bytes in length and with codeword 3 (00000011). Although this code has been observed for all IS-95 mobiles, use of a different code is also possible. This new code can be learned by the infrastructure 199 for issuance of forward link layer 2 signaling message alerting the mobile of the call waiting. The mobile user in response presses the send key. The infrastructure unit 199, waiting in anticipation, subsequently learns the code associated with the send key (flash with information). In turn, this code is used by the infrastructure unit for subsequent call-waiting switching. Upon detecting switching between parties, according to the invention, the echo canceller (EC) critical parameters are reconfigured. The critical parameters may include echo return loss (ERL) estimate, and EC adaptive filter coefficients. According to various aspects of the invention, the active EC coefficients as well echo return loss (ERL) estimate are swapped preventing reconvergence of EC when switching from one caller to another. In another embodiment, only the value of ERL is swapped which requires the EC reconvergence however the period of reconvergence is much shorter and the echo canceller is not far from an optimum operation during the reconvergence period.

The EC may be bypassed if the detected echo path is almost equal to zero (i.e. no echo generation.) Normally, when a call connection is between two digital mobile callers, the echo generated is almost equal to zero, or it is set to zero by convention. A digital communication system includes a Vocoder that performs speech compression on the outgoing speech signal and speech decompression on the incoming speech signal. When the callers 111 and 112 as shown are digital wireless callers, the echo canceller is bypassed when switching the call connection from a call between callers 111 and 114 to callers 111 and 112.

The communication system 100 may use echo cancellers that are external. When using an external EC, upon detection of switching between parties, a mobile switching center (MSC) in infrastructure 199 can in turn inform the external EC of the call waiting event, so that the external EC functions according to various aspects of the invention. In applications where an internal EC is remote from the layer 2 termination entity, the EC is informed of the pending call-switch-over by an inband messaging. The invention is equally applicable in GSM and TDMA (IS-54, IS-136) systems where they use FACCH (fast associated control channel) for reverse link transmission of "Flash With Information Message." Various aspects of the invention may be implemented by software, hardware or a combination as well known by one ordinary skilled in the art.

What is claimed is:

1. A method of canceling echo in a plurality of call connections in a call-waiting scenario comprising the steps of:

calculating a first echo return loss estimate and a first set of echo coefficients associated with a first of the plurality of call connections;

receiving a first flash with information message requesting that a second of the plurality of call connections become active;

learning a code associated with the first flash with information message for subsequent switch requests;

saving the first echo return loss estimate and the first set of echo coefficients associated with the first of the plurality of call connections;

activating the second of the plurality of call connections;

receiving a second flash with information message requesting that the first of the plurality of call connections become active;

activating the first of the plurality of call connections; and canceling echo in the first of the plurality of call connections using the first echo return loss estimate and the first set of echo coefficients.

2. The method of claim 1 wherein before performing the step of receiving a second flash with information message, the method comprises the step of calculating a second echo return loss estimate and a second set of echo coefficients associated with the second of the plurality of call connections.

3. The method of claim 2 wherein before performing the step of activating the first of the plurality of call connections, the method comprises the step of saving the second echo return loss estimate and second set of echo coefficients associated with the second of the plurality of call connections.

4. The method of claim 3 further comprising the steps of:

receiving a third flash with information message requesting that the second of the plurality of call connections become active;

activating the second of the plurality of call connections;

canceling echo in the second of the plurality of call connections using the second echo return loss estimate and the second set of echo coefficients.

5. The method of claim 1 wherein before receiving a second flash with information message, the method comprises the step of initializing the echo return loss estimate and set of echo coefficients for the second of the plurality of call connections.

6. In a wireless communication system capable of servicing a call waiting scenario comprising a first call between a mobile and a second caller and a second call between the mobile and a third caller, a method for echo cancellation comprising the steps of:

a) while the first call is active, calculating a first echo return loss estimate and first echo coefficients;

b) while the first call is active, detecting that the second call is incoming;

c) sending a first flash with information message indicative of the call-waiting scenario to the mobile;

d) receiving a second flash with information message from the mobile requesting to be switched to the third caller;

e) learning a code associated with call waiting sent in the second flash with information message from the mobile f) saving the first echo return loss estimate and first echo coefficients calculated during the first call;

g) switching the mobile from the second caller to the third caller;

h) calculating the second echo return loss estimate and second echo coefficients;

i) receiving a third flash with information message from the mobile requesting to be switched from the third caller to the second caller;

j) switching the mobile from the third caller to the second caller;

k) retrieving the first echo return loss estimate and first echo coefficients calculated during the first call; and l) canceling echo in the first call using the first echo return loss estimate and first echo coefficients.

7. The method of claim 6 further comprising between steps g) and h) the step of initializing a second echo return loss estimate and second echo coefficients for the second call.

8. The method of claim 6 further comprising the steps of:

m) receiving a fourth flash with information message from the mobile requesting to be switched from the second caller to the third caller;

n) switching the mobile from the second caller to the third caller;

o) retrieving the second echo return loss estimate and second echo coefficients calculated during the second call; and p) canceling echo in the second call using the second echo return loss estimate and second echo coefficients.

* * * * *